USO10421308B2

(12) United States Patent
Zhang et al.

(10) Patent No.: US 10,421,308 B2
(45) Date of Patent: Sep. 24, 2019

(54) OPTICAL ANTI-COUNTERFEITING COMPONENT AND OPTICAL ANTI-COUNTERFEITING PRODUCT

(71) Applicants: ZHONGCHAO SPECIAL SECURITY TECHNOLOGY CO., LTD, Beijing (CN); CHINA BANKNOTE PRINTING AND MINTING CORP., Beijing (CN)

(72) Inventors: Baoli Zhang, Beijing (CN); Kai Sun, Beijing (CN); Weiwei Zhang, Beijing (CN)

(73) Assignee: ZHONGCHAO SPECIAL SECURITY TECHNOLOGY CO., LTD, Beijing (CN)

( * ) Notice: Subject to any disclaimer, the term of this patent is extended or adjusted under 35 U.S.C. 154(b) by 40 days.

(21) Appl. No.: 15/518,794

(22) PCT Filed: Sep. 11, 2015

(86) PCT No.: PCT/CN2015/089408
§ 371 (c)(1),
(2) Date: Apr. 13, 2017

(87) PCT Pub. No.: WO2016/058465
PCT Pub. Date: Apr. 21, 2016

(65) Prior Publication Data
US 2017/0239972 A1 Aug. 24, 2017

(30) Foreign Application Priority Data

Oct. 16, 2014 (CN) .......................... 2014 1 0548750

(51) Int. Cl.
B42D 25/328 (2014.01)
B42D 25/21 (2014.01)
(Continued)

(52) U.S. Cl.
CPC ........... *B42D 25/328* (2014.10); *B42D 25/21* (2014.10); *B42D 25/24* (2014.10); *B42D 25/29* (2014.10);
(Continued)

(58) Field of Classification Search
CPC .... B42D 25/328; B42D 25/324; B42D 25/24; B42D 25/29; B42D 24/45; B42D 25/369;
(Continued)

(56) References Cited

U.S. PATENT DOCUMENTS

2012/0228860 A1* 9/2012 Rauch .................... B42D 25/29
283/85
2012/0235399 A1* 9/2012 Lochbihler .......... G02B 5/1809
283/94
2012/0319395 A1 12/2012 Fuhse et al.

FOREIGN PATENT DOCUMENTS

CN 104385800 4/2010
CN 103847289 1/2013
(Continued)

Primary Examiner — Justin V Lewis
(74) Attorney, Agent, or Firm — Porzio Bromberg & Newman P.C.

(57) ABSTRACT

The present invention discloses an optical anti-counterfeiting component and an optical anti-counterfeiting product. The optical anti-counterfeiting component comprises: a substrate; a sub-wavelength surface micro-structure and an optical reflection facet formed on an upper surface of the substrate; and a multi-layer structured coating formed on the sub-wavelength surface micro-structure and the optical reflection facet. In the case where the same multi-layer structured coating is used, a contrasting optical characteristic is formed between the region in which the sub-wavelength surface micro-structure and the multi-layer structured coating lie and the region in which the optical reflection facet and the multi-layer structured coating lie, so that the optical anti-counterfeiting component or the optical anti-
(Continued)

counterfeiting product that includes the optical anti-counterfeiting component can be identified easily and has high anti-counterfeiting capability.

14 Claims, 2 Drawing Sheets

(51) Int. Cl.

| | | |
|---|---|---|
| *G06K 19/06* | (2006.01) | |
| *B42D 25/378* | (2014.01) | |
| *B42D 25/369* | (2014.01) | |
| *B42D 25/30* | (2014.01) | |
| *B42D 25/24* | (2014.01) | |
| *B42D 25/29* | (2014.01) | |
| *G06K 19/14* | (2006.01) | |
| *B42D 25/45* | (2014.01) | |
| *B42D 25/324* | (2014.01) | |

(52) U.S. Cl.
CPC ............ *B42D 25/30* (2014.10); *B42D 25/324* (2014.10); *B42D 25/369* (2014.10); *B42D 25/378* (2014.10); *B42D 25/45* (2014.10); *G06K 19/06121* (2013.01); *G06K 19/14* (2013.01)

(58) Field of Classification Search
CPC ...... B42D 25/378; B42D 25/21; B42D 25/30; G06K 19/14; G06K 19/06121
USPC ................................. 283/72, 75, 94, 98, 901
See application file for complete search history.

(56) References Cited

FOREIGN PATENT DOCUMENTS

| | | |
|---|---|---|
| CN | 103832114 | 6/2014 |
| WO | 2014019269 | 2/2014 |

\* cited by examiner

OPTICAL ANTI-COUNTERFEITING COMPONENT AND OPTICAL ANTI-COUNTERFEITING PRODUCT

FIELD of the INVENTION

The present invention relates to the optical anti-counterfeiting field, in particular to an optical anti-counterfeiting component and an optical anti-counterfeiting product.

BACKGROUND OF THE INVENTION

To prevent forgery of various high-security or high added-value prints, such as banknotes, certificates, and product packages, etc., a multi-layer structured coating technique is widely applied. The multi-layer structured coating technique can present different color characteristics or present different colors at different viewing angles, which can't be imitated or duplicated by means of electronic devices such as cameras, scanners, and printers, etc.; therefore, it has high anti-counterfeiting capability. However, the requirements in the anti-counterfeiting field can't be satisfied well by multi-layer coating technique solely nowadays.

In the prior art, optical variable magnetic ink (OVMI) is formed by adding a magnetic layer in an optical variable structure, and the OVMI particles can be induced by the magnetic field to align directionally in the directions of the magnetic induction lines, so that specific graphic and text structures can be formed. However, owing to the fact that the optical variable magnetic particles rely on a magnetic field to achieve a directional alignment, the shape can't be designed freely under the constraints of the shape of the magnetic field; in addition, special orientation equipment and process are required to achieve directional alignment of the optical variable magnetic particles. Moreover, a technical integration solution that combines interferential multi-layer coating with holographic technique, and color matching technique, etc. is complex, and the corresponding effect is not ideal. Therefore, with such a technical integration solution, the improvement of anti-counterfeiting capability of the interferential multi-layer coating is still limited.

SUMMARY OF THE INVENTION

The object of the present invention is to provide an optical anti-counterfeiting component and an optical anti-counterfeiting product, in order to improve performance of the anti-counterfeiting products.

The present invention provides an optical anti-counterfeiting component, comprising: a substrate; a sub-wavelength surface micro-structure and an optical reflection facet formed on an upper surface of the substrate; and a multi-layer structured coating formed on the sub-wavelength surface micro-structure and the optical reflection facet.

Preferably, the sub-wavelength surface micro-structure and the optical reflection facet overlap with each other partially.

Preferably, the multi-layer structured coating forms a Fabry-Perot resonant cavity.

Preferably, the multi-layer structured coating forms a hollowed-out pattern.

Preferably, the hollowed-out pattern has a registration relationship with the sub-wavelength surface micro-structure and/or the optical reflection facet.

Preferably, the sub-wavelength surface micro-structure is an one-dimensional grating or a two-dimensional grating; a groove shape of the sub-wavelength surface micro-structure is sinusoidal, rectangular, or zigzag shape, or a shape joined or combined from at least two of sinusoidal, rectangular, and zigzag shapes.

Preferably, a groove depth of the sub-wavelength surface micro-structure is 10 nm-500 nm.

Preferably, the groove depth of the sub-wavelength surface micro-structure is 50 nm-300 nm.

Preferably, a characteristic dimension of the sub-wavelength surface micro-structure in a two-dimensional plane in which the sub-wavelength surface micro-structure lies is 50 nm-500 nm.

Preferably, the characteristic dimension of the sub-wavelength surface micro-structure in a two-dimensional plane in which the sub-wavelength surface micro-structure lies is 200 nm-400 nm.

Preferably, a characteristic dimension of the optical reflection facet in at least one dimension of a two-dimensional plane in which the optical reflection facet lies is 1 μm-300 μm.

Preferably, the characteristic dimension of the optical reflection facet in at least one dimension of a two-dimensional plane in which the optical reflection facet lies is 3 μm-100 μm.

Preferably, the characteristic dimension of the optical reflection facet in at least one dimension in a two-dimensional plane in which the optical reflection facet lies is 5 μm-30 μm.

Preferably, at least one of diffraction optical variable feature, micro-nano structural feature, printing feature, fluorescent feature, and magnetic, optical, electrical, or radioactive feature for machine reading is formed on at least one of the substrate, the sub-wavelength surface micro-structure, and the optical reflection facet.

Preferably, the multi-layer structured coating consists of an absorbing layer, a dielectric layer, and a reflecting layer.

The present invention further provides an optical anti-counterfeiting product, which includes the optical anti-counterfeiting component.

In the case where the same multi-layer structured coating is used, a contrasting optical characteristic is formed between the region in which the sub-wavelength surface micro-structure and the multi-layer structured coating lie and the region in which the optical reflection facet and the multi-layer structured coating lie, so that the optical anti-counterfeiting component or the optical anti-counterfeiting product that includes the optical anti-counterfeiting component can be identified easily and has high anti-counterfeiting capability.

Other features and advantages of the present invention will be further detailed in the embodiments hereunder.

DESCRIPTION OF THE DRAWINGS

The accompanying drawings are provided here to facilitate further understanding on the present invention, and constitute a part of this document. They are used in conjunction with the following embodiments to explain the present invention, but shall not be comprehended as constituting any limitation to the present invention. Among the drawings.

DESCRIPTION OF THE SYMBOLS

| 101 | Substrate | 102 | Upper surface |
| 103 | Multi-layer structured coating | 1021 | Sub-wavelength surface micro-structure |
| 1022 | Optical reflection facet | 1022' | Curved surface |
| 1 | Optical anti-counterfeiting component | | |

DETAILED DESCRIPTION OF THE EMBODIMENTS

Hereunder some embodiments of the present invention will be detailed with reference to the accompanying drawings. It should be appreciated that the embodiments described here are only provided to describe and explain the present invention, but shall not be deemed as constituting any limitation to the present invention.

Figure 1:
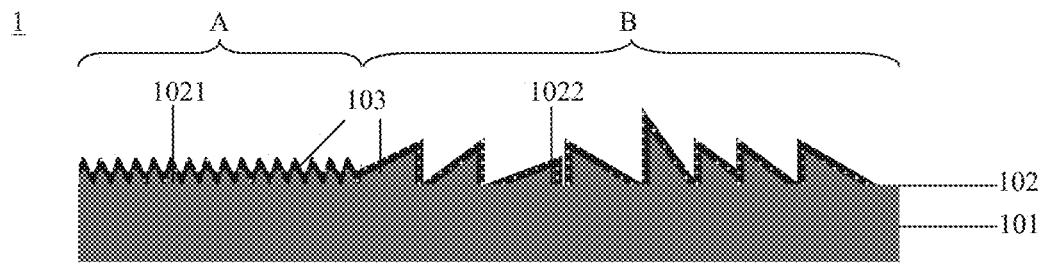
FIG. 1 is a sectional view of the optical anti-counterfeiting component according to an embodiment of the present invention.

The present invention provides an optical anti-counterfeiting component 1. As shown in FIG. 1, the optical anti-counterfeiting component 1 comprises: a substrate 101, a sub-wavelength surface micro-structure 1021, an optical reflection facet 1022, and a multi-layer structured coating 103, wherein, the sub-wavelength surface micro-structure 1021 is formed on an upper surface 102 of the substrate 101, and the sub-wavelength surface micro-structure 1021 at least partially cover the upper surface 102; the optical reflection facet 1022 is formed on the upper surface 102 of the substrate 101, and the optical reflection facet 1021 at least partially covers the upper surface 102; a region in which the sub-wavelength surface micro-structure 1021 lies is denoted as region A, and a region in which the optical reflection facet 1022 lies is denoted as region B; the multi-layer structured coating 103 at least partially covers the region A and the region B. Since the multi-layer structured coating 103 covers the region A and the region B, the region A and the region B are different from each other in color; moreover, the region B has an optical scattering characteristic provided by substantially random change distributed in a two-dimensional plane in which the optical facet lies according to the orientation of the optical facet, and/or the region B can be perceived by the observer as a surface protruding forward and/or backward relative to its actual spatial shape according to the selected orientation of the optical facet.

The sub-wavelength surface micro-structure can be a one-dimensional grating or two-dimensional grating, and the groove shape of the sub-wavelength surface micro-structure can be sinusoidal, rectangular, or zigzag shape, etc.; the grating distribution of the two-dimensional grating can be in an orthogonal structure, honeycomb structure, two-dimensional Bravais lattice structure, or random structure, etc. It should be understood that the structure of the sub-wavelength surface micro-structure is not limited to the above-mentioned structures; moreover, a structure joined or combined from those structures can be used for the sub-wavelength surface micro-structure in the actual optical anti-counterfeiting component. By designing the sub-wavelength surface micro-structure, patterns such as text and logo, etc. required for anti-counterfeiting can be realized.

Preferably, the groove depth of the sub-wavelength surface micro-structure is 10 nm-500 nm, and more preferably is 50 nm-300 nm. In addition, the characteristic dimension of the sub-wavelength surface micro-structure in a two-dimensional plane in which the sub-wavelength surface micro-structure lies is 50 nm-500 nm, and preferably is 200 nm-400 nm. Preferably, if the characteristic dimension in one direction meets that requirement, the characteristic dimension in other direction is not limited.

Preferably, the period and the groove depth of the sub-wavelength surface micro-structure have a certain matching relationship with each other, that matching relationship can be represented by a depth-width ratio (i.e., ratio of groove depth to period), which can be calculated by strict coupled wave theoretical design according to the specific reproduction effect. Preferably, the range of the depth-width ratio generally is 0.3-2, and more preferably is 0.4-1.

Preferably, the duty cycle of the sub-wavelength surface micro-structure (i.e., ratio of grating ridge width to period) is also an important parameter that has an influence on the optical effect. The duty cycle mainly has an influence on the brightness and contrast of the optical anti-counterfeiting component. Generally, the duty cycle should be 0.3-0.7, and preferably is 0.4-0.6.

Hereunder the structure of the multi-layer structured coating 103 employed in the optical anti-counterfeiting component 1 according to the present invention will be described.

The multi-layer structured coating 103 can be in a multi-layer dielectric film structure, i.e., consisting of different dielectric layers that have high or low refractivity. Such structure is generally designed with a λ/4 film system. The materials of the dielectric layers can be one or more of inorganic coating film materials such as $MgF_2$, $SiO_2$, $Al_2O_3$, MgO, $HfO_2$, $TiO_2$, ZnS, and ZnO, etc. Alternatively, the dielectric layers can employ high molecular polymers, or employ the combination of inorganic coating film materials and high molecular polymers.

Alternatively, the structure of the multi-layer structured coating 103 can be a metal/dielectric multi-layer film structure, and generally employs three-layer structure or five-layer structure. For example, the structure of the multi-layer structured coating 103 can comprise at least one of the following structures:

a. a reflecting layer, a dielectric layer and an absorbing layer formed orderly on the sub-wavelength surface micro-structure, or formed in a reversed order;
b. an absorbing layer, a dielectric layer and an absorbing layer formed orderly on the sub-wavelength surface micro-structure, or formed in a reversed order;
c. an absorbing layer, a dielectric layer, a reflecting layer, a dielectric layer, and an absorbing layer formed orderly on the sub-wavelength surface micro-structure;
d. an absorbing layer, a dielectric layer, an absorbing layer, a dielectric layer, and an absorbing layer formed orderly on the sub-wavelength surface micro-structure.

In brief, a multi-layer structured coating in a three-layer structure consists of a reflecting layer, a dielectric layer and an absorbing layer, or consists of an absorbing layer, a dielectric layer and an absorbing layer, wherein, the former has an optical variable effect on one side only, while the latter has an optical variable effect on both sides. A multi-layer structured coating in a five-layer structure consists of an absorbing layer, a dielectric layer, a reflecting layer, a dielectric layer and an absorbing layer, or consists of an absorbing layer, a dielectric layer, an absorbing layer, a dielectric layer and an absorbing layer. The multi-layer structured coating in a five-layer structure has optical variable effects in both sides, and the optical variable effects can be designed as being identical to each other or different from each other, depending on the parameters and materials of the reflecting layer, dielectric layer, and absorbing layer.

The above-mentioned reflecting layer generally is a metal layer in larger thickness that is generally greater than 20 nm, and the material of the reflecting layer can be one or more of Au, Ag, Al, Fe, Sn, Zn, Ni, and Cr, etc. The above-mentioned dielectric layers can be single-layer dielectric layers, the dielectric materials of the dielectric layers can be selected from inorganic coating film materials such as $MgF_2$, $SiO_2$, $Al_2O_3$, MgO, PMMA, $HfO_2$, $TiO_2$, ZnS, and ZnO or the like and high molecular polymers, and the thickness generally is 10 nm-1000 nm, and preferably is 50 nm-800 nm, depending on the optical effect to be achieved and the refractivity of material. Of course, the dielectric layers can be multi-layer dielectric layers, the dielectric materials of the dielectric layers can be selected from commonly used inorganic coating film materials such as $MgF_2$, $SiO_2$, $Al_2O_3$, MgO, PMMA, $HfO_2$, $TiO_2$, ZnS, and ZnO or the like, and the multi-layered dielectric films are generally used with a $\lambda/4$ film system design of high and low refractivity. The materials of the absorbing layers can be one or more of metal materials such as Au, Ag, Cu, Al, Fe, Sn, Zn, Ni, and Cr and the like or metallic compounds, the thickness generally doesn't exceed 20 nm, and preferably is 5-10 nm, for the purpose of partial reflection, partial transmission, and partial absorption of the illumination light.

It should be understood that the structure of the multi-layer structured coating 103 according to the present invention is not limited to the above-mentioned. structure; for example, a two-layer structure (i.e., a reflecting layer and a dielectric layer), a four-layer structure (i.e., an absorbing layer, a dielectric layer, a reflecting layer, and a dielectric layer), etc., are also permitted.

The multi-layer structured coating 103 can form a Fabry-Perot resonant cavity, which has a selective absorption and reflection effect for incident white light, so that the exiting light only contains specific wave bands, and thereby specific colors are formed; when the incident angle or exit angle of the light changes, the corresponding light path will change, and the interference wave band will change too, resulting in change of the colors presented to the observer, and thereby an optical variable effect in specific colors is created.

As for the optical characteristics obtained from a combination of the sub-wavelength surface micro-structure and the multi-layer structured coating, the parameter matching relationship, specific principle, and optical characteristics have been defined specifically in the Chinese Patent No. CN10251443, the content of which is included in the present invention. In summary, by virtue of a combination of the sub-wavelength surface micro-structure 1021 and the multi-layer structured coating 103, a color change characteristic that the color changes with the viewing angle is created, and is different from a color characteristic solely provided by a multi-layer structured coating with a flat or smooth surface; thus, a unique color change characteristic that the color changes with the viewing angle is created.

Hereunder the optical characteristics provided by virtue of a combination of the optical reflection facet 1022 and the multi-layer structured coating 103 will be described with reference to FIG. 1.

The characteristic dimension or period of the optical reflection facet 1022 in at least one dimension of a two-dimensional plane in which the optical reflection facet 1022 lies (the facet can be formed to be periodic or aperiodic) is 1 μm-300 μm preferably is 3 μm-100 μm, and particularly preferably is 5 μm-30 μm. The depth of the optical reflection facet is smaller than 10 μm, and preferably is 1 μm-5 μm. Thus, the facet has no light diffraction effect in the visible wavelength range.

The orientation of the optical reflection facet can be determined according to its inclination angle and/or azimuth angle.

As for the optical characteristics obtained from a combination of the optical reflection facet 1022 and the multi-layer structured coating 103, the specific parameter setting, principle, and optical characteristics have been defined by Chinese Patent No. CN102514443, CN102905909, CN103282212 and CN103229078 jointly, the content of which is included in the present invention.

The characteristics of the multi-layer structured coating 103 on a flat surface include characteristics in two aspects: its color and color change with viewing angle. The color characteristic provided by the multi-layer structured coating 103 is not changed in actual by the combination of the optical reflection facet 1022 and the multi-layer structured coating 103, i.e., the multi-layer structured coating has the same selective absorption and reflection characteristics as a multi-layer structured coating formed on a flat surface; for a specific light source, only the direction of emergent light is modified corresponding to each optical reflection facet; hence, in actual, the distribution of the viewing angle of the color change characteristic of the multi-layer structured coating 103 on the two-dimensional surface in the region B is modified.

Owing to the above-mentioned result, in a case where the same multi-layer structured coating 103 is used, the region A and the region B are different from each other in color characteristic and color change characteristic.

The sub-wavelength surface micro-structure 1021 and the optical reflection facet 1022 can be transferred onto the surface of the substrate 101 by producing a master mask by holographic interferometry, laser photolithography, or electron-beam lithography, producing a work mask through an electroforming process, and then through a mold pressing or UV duplication process, etc.

Since the dimension parameters of the sub-wavelength surface micro-structure are greatly different by orders of magnitude from those of the optical reflection facet, the sub-wavelength surface micro-structure and the optical reflection facet have different requirements for the photoresist material of the master mask or the manufacturing process of the master mask. Actually, it is quite difficult to combine them on the same master mask or work mask through the same process. In actual practice, for example, the combination can be accomplished through two steps: First, producing the sub-wavelength surface micro-structure by holographic interferometry; then, producing the optical reflection facet by laser direct writing through a registration photoetching process.

The multi-layer structured coating 103 generally can be formed through an vacuum coating process, such as thermal evaporation, electron beam evaporation, high-frequency sputtering, magnetron sputtering, ion sputtering, reactive sputtering, or ion coating, etc., or some of the layers can be formed through a chemical plating, electroplating, or spreading process, etc.

It should be noted that the multi-layer structured coating covering the sub-wavelength surface micro-structure 1021 and the optical reflection facet 1022 is generally formed in the same process, for the sake of simplifying the production process. Therefore, the parameters of the multi-layer structured coating on the surface of the sub-wavelength surface micro-structure 1021 are essentially the same as those of the multi-layer structured coating on the surface of the optical reflection facet 1022. Hence, an overall consideration should be made in the structural design of the film system of the multi-layer structured coating 103 and the structural design calculation of the sub-wavelength surface micro-structure 1021 and optical reflection facet 1022, so that the optical characteristics in the region A have a strong color contrast to the optical characteristics in the region B, and thereby the purpose of easy identification and forgery prevention for the anti-counterfeiting component is achieved.

Figure 2A:
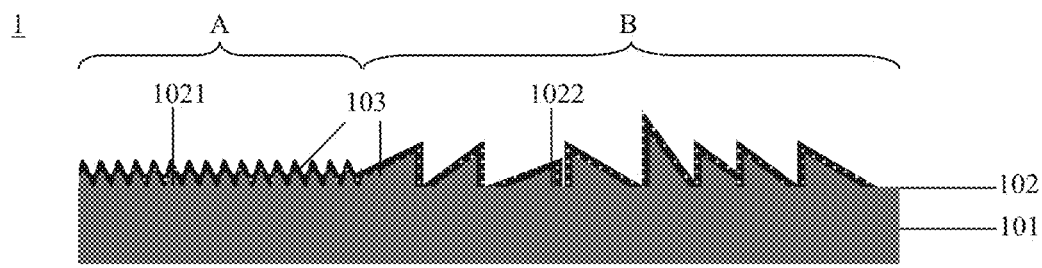
FIGS. 2(a) and 2(b) are sectional views of the optical anti-counterfeiting component according to another embodiment of the present invention.
Figure 2B:
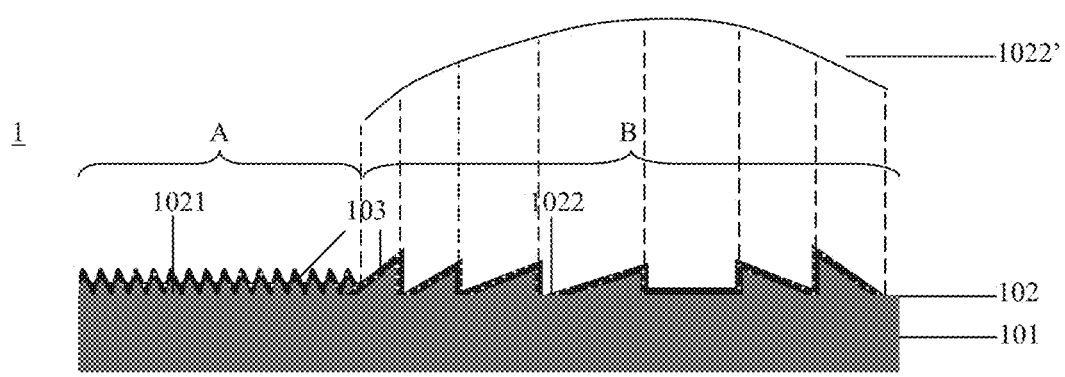

Hereunder the optical characteristics of the optical anti-counterfeiting component will be described with reference to FIGS. 2(a) and 2(b) respectively. In the optical anti-counterfeiting component 1 according to the present invention, the optical reflection facet 1022 has an optical scattering characteristic provided by substantially random change distributed in a two-dimensional plane in which the optical reflection facet 1022 lies, and the region B can be perceived by the observer as a surface that protrudes forward and/or backward relative to its actual spatial shape according to the selected orientation of the optical reflection facet 1022. The structure of the optical reflection facet 1022 that has different parameters in the region B in FIG. 2(a) has a random or pseudo-random alignment in a two-dimensional plane where the structure is, and the structural parameters include the depth, width, inclination angle, and azimuth angle of the optical reflection facet; thus, after the incident light is selectively absorbed and reflected by the multi-layer structured coating on the surface of the optical reflection facet, the reflected light has a random or pseudo-random exit direction, and thereby forms an optical scattering characteristic. FIG. 2(b) shows that the optical reflection facet 1022 is utilized to simulate a curved surface 1022' and thereby forms a characteristic of protruding from the surface 102 in the region B. Here, any optical reflection facet in the two-dimensional plane has substantially similar normal direction as the simulated curved surface 1022° at that position.

Figure 3:
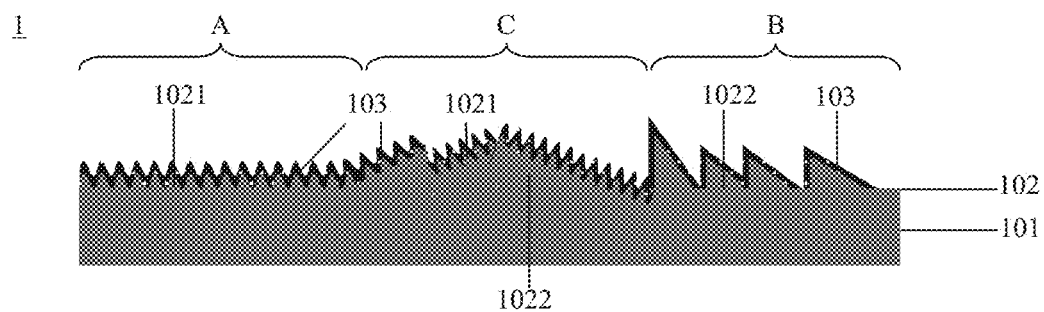
FIG. 3 is a sectional view of the optical anti-counterfeiting component according to yet another embodiment of the present invention.

FIG. 3 shows an embodiment in which a region C and associated anti-counterfeiting characteristics are further added on the basis of the optical anti-counterfeiting component 1 according to the present invention, wherein, the sub-wavelength surface micro-structure 1021 and the optical reflection facet 1022 are overlapped to form the region C on the upper surface 102 of the substrate 101. The anti-counterfeiting characteristics include the two anti-counterfeiting characteristics mentioned above, i.e., the anti-counterfeiting characteristic obtained by virtue of the combination of the sub-wavelength surface micro-structure 1021 and the multi-layer structured coating 103 and the anti-counterfeiting characteristic obtained by virtue of the combination of the optical reflection facet 1022 and the multi-layer structured coating 103. That is to say, the anti-counterfeiting characteristics of the region C have the color and color change characteristics formed by the sub-wavelength surface micro-structure 1021 and the multi-layer structured coating 103 different from those of the multi-layer structured coating, as well as the optical scattering characteristic resulted from random distribution of the optical reflection facets 1022 on the two-dimensional surface of the region C and/or the characteristic of a surface protruding forward and/or backward relative to the surface of the region C as perceived by the observer.

For example, in FIG. 3, the sub-wavelength surface micro-structure 1021 has sinusoidal groove shape, 300 nm period, and 95 nm depth, and is in orthogonal two-dimensional grid distribution, and the multi-layer structured coating 103 includes sequentially arranged Al (40 nm)/$SiO_2$ (370 nm)/Cr (5 nm) layers (on a flat surface, the multi-layer structured coating that has the above-mentioned parameter has a characteristic that it exhibits a golden yellow color when it is viewed from the front side and exhibits a green color when it is viewed obliquely). Thus, owing to the existence of the sub-wavelength surface micro-structure 1021, the region A exhibits a red color when it is viewed from the front side, and exhibits a yellow color when it is viewed inclined; the region B has the characteristic of color change from golden yellow to green provided by the multi-layer structured coating and the optical scattering characteristic and/or protruding characteristic provided by the optical reflection facet; the region C has the characteristic of color change from red to yellow formed by the sub-wavelength surface micro-structure and the multi-layer structured coating jointly and the optical scattering characteristic and/or protruding characteristic provided by the optical reflection facet. In summary, the three regions A, B and C have their respective visual characteristics and form a strong visual contrast to each other; thus, the optical anti-counterfeiting component 1 has strong anti-counterfeiting capability.

Preferably, in the optical anti-counterfeiting component according to the present invention, the coverage of the multi-layer structured coating is patterned, and thereby forms an hollowed-out feature. The entire multi-layer structured coating can be patterned, or one or more layers of the multi-layer structured coating can be patterned respectively. For example, a patterned protective layer is applied after the multi-layer structured coating is formed by printing, and then the coating outside of the protective area is etched with a chemical solvent (e.g., alkaline liquor). Alternatively, a stripping layer is formed before the multi-layer structured coating is formed, and the coating on the stripping layer is removed by soaking with a liquid (e.g., water) to form a hollowed-out pattern after the multi-layer structured coating is formed.

Figure 4:
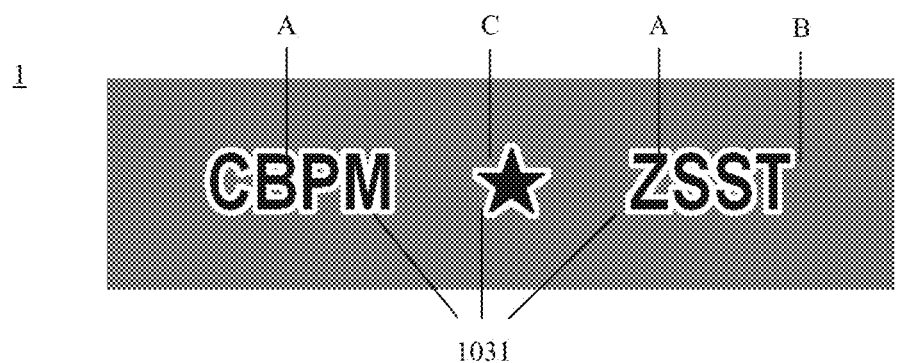
FIG. 4 is a top view of the optical anti-counterfeiting component according to yet another embodiment of the present invention.

Preferably, as shown in FIG. 4, i.e., a top view of an embodiment of the optical anti-counterfeiting component according to the present invention, the hollowed-out pattern 1031 of the multi-layer structured coating 103 (uncovered region of the multi-layer structured coating) has a strict position correspondence relationship with the sub-wavelength surface micro-structure 1021 and/or optical reflection facet 1022; thus, the optical anti-counterfeiting component according to the present invention can be identified more easily and has stronger forgery prevention capability. Wherein, A, B, C correspond to the three regions A, B and C in FIG. 3, i.e., "CBPM" and "ZSST" have a color characteristic and a characteristic of color change with viewing angle, which are formed by the sub-wavelength surface micro-structure and the multi-layer structured coating formed on the surface of the sub-wavelength surface micro-structure jointly and are different from those in the region B and region C; the region B has an optical scattering characteristic and a characteristic of color change with viewing angle, which are formed by the optical reflection facet and the multi-layer structured coating formed on the surface of the optical reflection facet jointly; region C has a characteristic of surface protruding forward relative to the actual spatial shape and a characteristic of color change with viewing angle, which are resulted from the optical reflection facet and the multi-layer structured coating formed on the surface of the optical reflection facet.

Hereunder an exemplary method for forming the hollowed-out region 1031 is provided: a sinusoidal optical grating is formed in the region 1031, the period of the sinusoidal optical grating is 350 nm, and the deep of the sinusoidal optical grating is 300 nm (suppose the depth-width ratio of that structure is greater than that of the surface micro-structure outside of the region 1031), Then, an Al layer in 5 nm thickness and a $SiO_2$ layer in 250 nm thickness are deposited on the top surface 102; next, the optical anti-counterfeiting component 1 is soaked in 10% NaOH solution, till that the Al layer in the region 1031 completely disappears rightly; at this point, the surface outside of the region 1031 is still covered by the Al layer and $SiO_2$ layer. Then, an Al layer in 40 nm thickness is deposited on the $SiO_2$ layer, and a $SiO_2$ layer in 50 nm thickness is deposited on the surface of the new Al layer; next, the optical anti-counterfeiting component 1 is soaked in 5% NaOH solution, till the Al layer in the region 1031 completely disappears rightly. At this point, when the optical anti-counterfeiting component 1 is viewed from the side of the lower surface of the region 1031, it is seen that a multi-layer structured coating is provided in the area outside of the region 1031. In addition, a hollowed-out pattern is formed in the region 1031, because there is no coating in the region.

Hereunder another exemplary method for forming the hollowed-out region 1031 is provided: cylindrical mirrors are formed in the region 1031, the width of the cylindrical mirror is 30 μm, the clearance between the cylindrical mirrors is 2 μm, and the height of the cylindrical mirror is 10 μm (greater than the 1.5 μm height of the optical reflection facet); an Al layer in 40 nm thickness (thickness in the flat area), a $SiO_2$ layer in 250 nm thickness, and a Cr layer in 5 nm thickness are deposited sequentially on the surface 102, and then a protective layer (polyester material) in 1 μm thickness (thickness of the flat surface) is formed through a spreading process. The optical anti-counterfeiting component is soaked in 10% NaOH solution at 40° C., till the Al/$SiO_2$/Cr coating in the region 1031 just completely disappears; at this point, the area outside of the region 1031 is stilled covered by the Al/$SiO_2$/Cr coating; thus, the optical anti-counterfeiting component is prepared. At this point, when the optical anti-counterfeiting component is viewed from the side of the top surface 102, it is seen that a multi-layer structured coating is provided by the sequentially stacked Al/SiO2/Cr layers in the area outside of the region 1031, and a hollowed-out pattern is formed in the region 1031.

In preferred embodiments according to the present invention, one or more of diffraction optical variable feature, micro-nano structural feature, printing feature, fluorescent feature, and magnetic, optical, electrical, or radioactive feature for machine reading can be formed in the substrate 101 and on the upper and lower surfaces of the substrate 101, and/or in and on the sub-wavelength surface micro-structure and optical reflection facet.

The optical anti-counterfeiting component according to the present invention can be used as a tag, logo, wide strip, transparent window, or overlaying film, etc., and can be bonded to different articles by means of different bonding mechanisms, For example, it can be transferred onto high-security products and high added-value products, such as bank notes and credit cards, etc.

In another aspect, the present invention provides a product with the optical anti-counterfeiting component, which includes, but is not limited to various high-security products and high added-value products such as bank notes, credit cards, passports, valuable securities, etc., and various packing paper and packing boxes, etc.

While some preferred embodiments of the present invention are described above with reference to the accompanying drawings, the present invention is not limited to the details in those embodiments. Those skilled in the art can make modifications and variations to the technical scheme of the present invention, without departing from the spirit of the present invention. However, all these modifications and variations shall be deemed as falling into the protected scope of the present invention.

In addition, it should be understood that the technical features described in the above embodiments can be combined in any appropriate manner, provided that there is no conflict among the technical features in the combination. To avoid unnecessary iteration, such possible combinations are not described here in the present invention.

Moreover, different embodiments of the present invention can be combined freely as required, as long as the combinations don't deviate from the ideal and spirit of the present invention. However, such combinations shall also be deemed as falling into the scope disclosed in the present invention.

The invention claimed is:

1. An optical anti-counterfeiting component, comprising:
   a substrate;
   a sub-wavelength surface micro structure and an optical reflection facet, wherein at least part of an upper surface of the substrate is covered by the sub-wavelength surface micro-structure and the optical reflection facet; and
   a multi-layer structured coating formed on the sub-wavelength surface micro-structure and the optical reflection facet, wherein, the multi-layer structured coating forms a Fabry-Perot resonant cavity or a hollowed-out pattern.

2. The optical anti-counterfeiting component according to claim 1, wherein, the sub-wavelength surface micro-structure and the optical reflection facet overlap with each other partially.

3. The optical anti-counterfeiting component according to claim 1, wherein, the sub-wavelength surface micro-structure is an one-dimensional grating or a two-dimensional grating; a groove shape of the sub-wavelength surface micro-structure is sinusoidal, rectangular, or zigzag shape, or a shape joined or combined from at least two of sinusoidal, rectangular, and zigzag shapes.

4. The optical anti-counterfeiting component according to claim 3, wherein, a groove depth of the sub-wavelength surface micro-structure is 10 nm-500 nm.

5. The optical anti-counterfeiting component according to claim 4, wherein, the groove depth of the sub-wavelength surface micro-structure is 50 nm-300 nm.

6. The optical anti-counterfeiting component according to claim 1, wherein, a characteristic dimension of the sub-wavelength surface micro-structure in a two-dimensional plane in which the sub-wavelength surface micro-structure lies is 50 nm-500 nm.

7. The optical anti-counterfeiting component according to claim 6, wherein, the characteristic dimension of the sub-wavelength surface micro-structure in a two-dimensional plane in which the sub-wavelength surface micro-structure lies is 200 nm-400 nm.

8. The optical anti-counterfeiting component according to claim 1, wherein, a characteristic dimension of the optical reflection facet in at least one dimension of a two-dimensional plane in which the optical reflection facet lies is 1 µm-300 µm.

9. The optical anti-counterfeiting component according to claim 8, wherein, the characteristic dimension of the optical reflection facet in at least one dimension of a two-dimensional plane in which the optical reflection facet lies is 3 µm-100 µm.

10. The optical anti-counterfeiting component according to claim 9, wherein, the characteristic dimension of the optical reflection facet in at least one dimension in a two-dimensional plane in which the optical reflection facet lies is 5 µm-30 µm.

11. The optical anti-counterfeiting component according to claim 1, wherein, at least one of diffraction optical variable feature, micro-nano structural feature, printing feature, fluorescent feature, and magnetic, optical, electrical, or radioactive feature for machine reading is formed on at least one of the substrate, the sub-wavelength surface microstructure, and the optical reflection facet.

12. The optical anti-counterfeiting component according to claim 11, wherein, the hollowed-out pattern has a registration relationship with the sub-wavelength surface microstructure and/or the optical reflection facet.

13. The optical anti-counterfeiting component according to claim 1, wherein, the multi-layer structured coating consists of at least two of an absorbing layer, a dielectric layer, and a reflecting layer, or the multi-layer structured coating consists of dielectric layers.

14. An optical anti-counterfeiting product, comprising the optical anti-counterfeiting component of claim 1.

\* \* \* \* \*